United States Patent
Tepper

[19]
[11] Patent Number: 6,086,755
[45] Date of Patent: Jul. 11, 2000

[54] FLOATING HYDROPONIC BIOFILTRATION DEVICE

[76] Inventor: Julius Tepper, 1 Saddlebrook La., Manoville, N.Y. 11949

[21] Appl. No.: 09/316,864

[22] Filed: May 21, 1999

[51] Int. Cl.[7] .................................................. C02F 3/32
[52] U.S. Cl. ......................... 210/150; 210/169; 210/170; 210/242.1; 210/602; 47/64; 119/260
[58] Field of Search .................................... 210/150, 170, 210/242.1, 169, 602; 47/63, 64, 59; 119/260

[56] References Cited

U.S. PATENT DOCUMENTS

| | | | |
|---|---|---|---|
| 3,608,238 | 9/1971 | Reuter | 47/64 |
| 4,037,360 | 7/1977 | Farnsworth . | |
| 4,086,161 | 4/1978 | Burton | 210/150 |
| 4,708,792 | 11/1987 | Takambe et al. | 210/150 |
| 4,872,985 | 10/1989 | Dinges | 210/602 |
| 4,908,128 | 3/1990 | Chiba | 210/150 |
| 4,995,980 | 2/1991 | Jaubert . | |
| 5,035,080 | 7/1991 | Kafka | 47/64 |
| 5,228,998 | 7/1993 | DiClemente et al. . | |
| 5,269,094 | 12/1993 | Wolverton et al. | 210/602 |
| 5,337,515 | 8/1994 | Hondulas . | |
| 5,393,426 | 2/1995 | Raskin et al. | 210/602 |
| 5,486,291 | 1/1996 | Todd et al. . | |
| 5,549,817 | 8/1996 | Horsley et al. . | |
| 5,618,428 | 4/1997 | Oslund . | |
| 5,746,921 | 5/1998 | Gargas et al. . | |
| 5,799,440 | 9/1998 | Ishikawa et al. . | |
| 5,876,484 | 3/1999 | Raskin et al. | 210/602 |
| 5,992,093 | 11/1999 | De Groot et al. | 47/64 |

OTHER PUBLICATIONS

E–Mail from Akzo Nobel Geosynthetics.
Excerpts from brochure of Oasis Grower Products.
Excerpts from Aquatic Eco–Systems, Inc.

*Primary Examiner*—Christopher Upton
*Attorney, Agent, or Firm*—Amster, Rothstein & Ebenstein

[57] ABSTRACT

A floating hydroponic biofiltration device for use in a body of oxygenated water containing plant-eating fish, includes, in series, (a) a float and a terrestrial plant hydroponically mounted in a float aperture, the float aperture being essentially devoid of soil, (b) a relatively open mesh of substantial depth below the float, the mesh being open at the sides thereof to enable passage of oxygenated water from the body of water therethrough, and (c) a relatively tight matting defining tortuous vertically extending passageways therethrough for the plant roots, the matting anchoring the plant roots and at least partially excluding plant-eating fish from a portion of the plant roots passing therethrough. Preferably the device additionally includes, beneath the matting, a netting to exclude large plant-eating fish from approaching from below the bottom of the matting. The mesh defines vertically extending passageways therethrough for the plant roots while also serving as a substrate surface for the growth of nitrogen-converting bacteria deposited thereon, the mesh excluding large plant-eating fish from a portion of the plant roots passing therethrough while permitting relatively smaller plant-eating fish to pass therethrough and deposit nitrogen-converting bacteria and their ammonia-containing fish waste.

13 Claims, 3 Drawing Sheets

FLOATING HYDROPONIC BIOFILTRATION DEVICE

BACKGROUND OF THE INVENTION

The present invention relates to a floating hydroponic biofiltration device, and more particularly such a device adapted to be used in a body of oxygenated water containing plant-eating fish.

Biofiltration systems for ponds and aquaria having water and fish are well known. Indeed, the broad concept of floats to support plants is disclosed in U.S. Pat. No. 4,037,360 and in U.S. Pat. No. 5,799,440 for terrestrial plants as well as U.S. Pat. No. 5,337,516 for wetland plants. However, the '360 Patent requires the plants to float in a tank of nutrient solution rather than the natural water of a pond or aquaria. Further, other floating biofiltration systems require the use of soil, such as U.S. Pat. No. 5,618,428 and U.S. Pat. No. 5,799,440, so that the plant is not grown hydroponically (that is, through the use of water, without soil).

It is also known to use nitrogen-converting bacteria in a water tank to convert the ammonia-containing waste from the fish (via nitrites) into the useful nitrates (required by the plant). Typically, the ammonia waste produced by the fish increases in concentration over time until the bacteria is not able to convert it all into useful nitrates; at that point the water is poisoned and should actually be changed. See, for example, U.S. Pat. No. 5,746,921.

The present invention is aimed primarily for use in outdoor ponds containing Koi (large oriental carp), although it also finds utility in various aquaria and in connection with other plant-eating fish. Although the device is specifically designed to protect the plant material from being eaten by the Koi who tend to be omnivorous (at times even eating their young) and would readily devour any plants they can reach.

Accordingly, it is the object of the present invention to provide a floating hydroponic biofiltration device for use in a body of oxygenated water containing plant-eating fish.

Another object is to provide such a device which is suitable for use in outdoor ponds containing Koi.

A further object is to provide such a device which provides a substrate for the growth of nitrogen-converting bacteria which convert the ammonia of fish waste to nitrates useful to plants.

It is a further object to provide such a device which is simple and economical to manufacture, use and maintain.

SUMMARY OF THE INVENTION

It has now been found that the above and related objects of the present invention are obtained in a floating hydroponic biofiltration device for use in a body of oxygenated water containing plant-eating fish. The device comprises in series: a float, a mesh and a matting. At the top of the device, a float defines an aperture therethrough, and a terrestrial plant is hydroponically mounted in the float aperture. The plant has roots extending downwardly through the bottom of the float and foliage extending above the top of the float, the float aperture being essentially devoid of soil. In the middle of the device, a relatively open mesh of substantial depth below the float is open at the sides thereof to enable passage of oxygenated water from the body of water therethrough. The mesh defines vertically extending passageways therethrough for the plant roots while also serving as a substrate surface for the growth of nitrogen-converting bacteria deposited thereon. The mesh excludes large plant-eating fish from a portion of the plant roots passing therethrough while permitting relatively smaller plant-eating fish to pass therethrough and deposit nitrogen-converting bacteria and their ammonia-containing fish waste on the mesh. Adjacent the bottom of the device, a relatively tight matting defines tortuous vertically extending passageways therethrough for the plant roots, the matting anchoring the plant roots and at least partially excluding plant-eating fish from a portion of the plant roots passing therethrough.

Optimally, beneath the matting is a netting to exclude large plant-eating fish from destroying from below the bottom of the matting.

In a preferred embodiment, the mesh and matting are formed of plastic. The device additionally includes, beneath the matting, a netting (preferably formed of plastic) to exclude large plant-eating fish from destroying from below the bottom of the matting or even approaching the bottom of the matting. The middle or mesh is optionally devoid of nitrogen-converting bacteria until the device is placed in a body of water. The mesh permits plant-eating fish having a length up to 1 inch and a thickness of less than 0.50 inch to pass therethrough, the mesh defining openings of 0.50–0.75 inches in width.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENT

Figure 1:
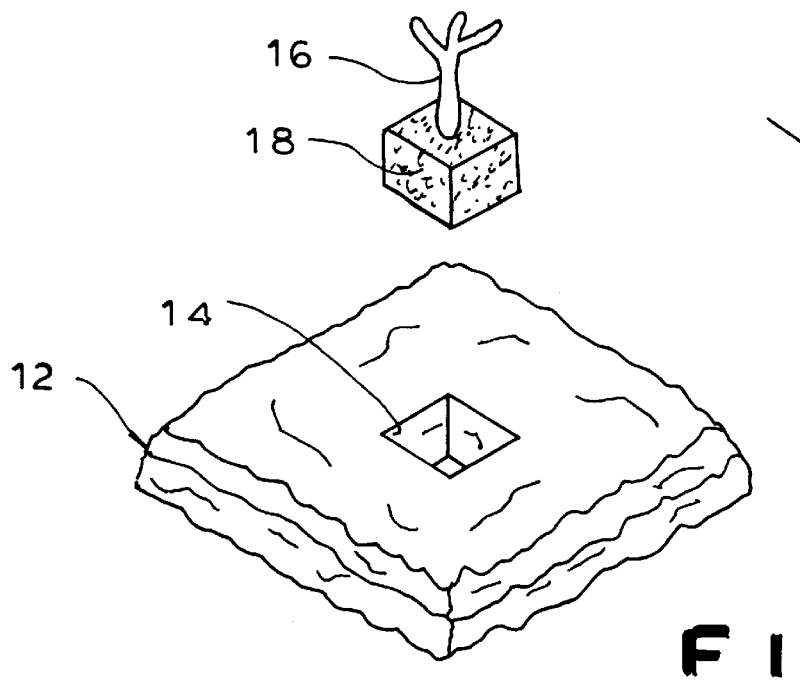
FIG. 1 is an exploded isometric view of a floating hydroponic biofiltration device according to the present invention.
Figure 1:
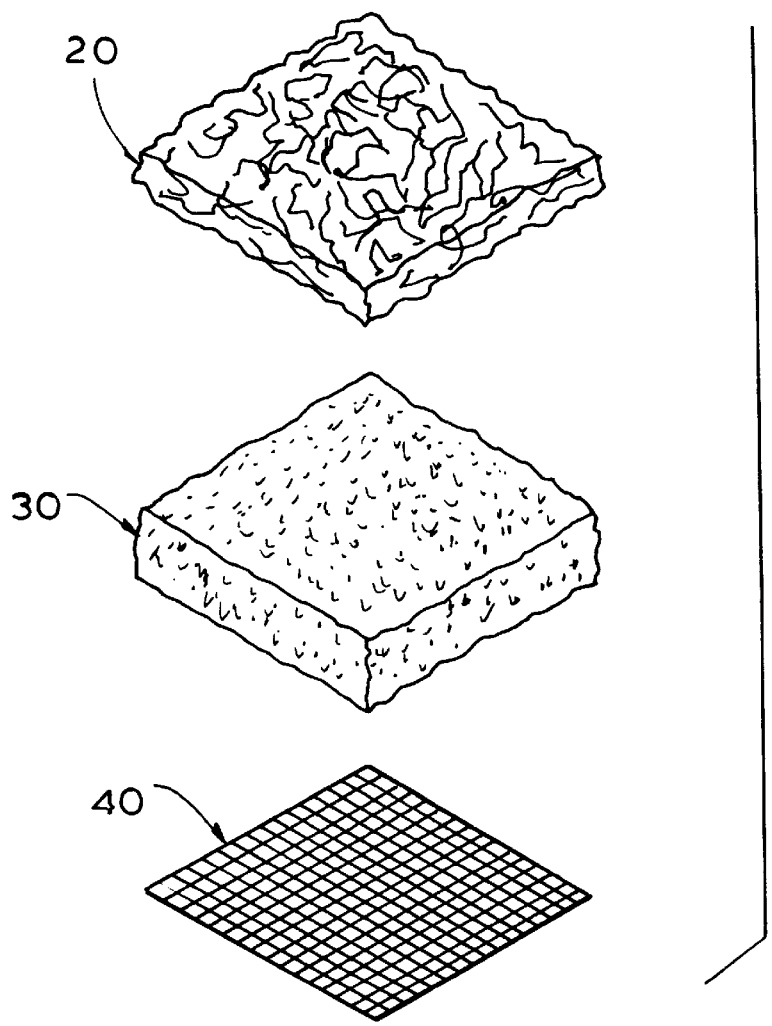
Figure 2:
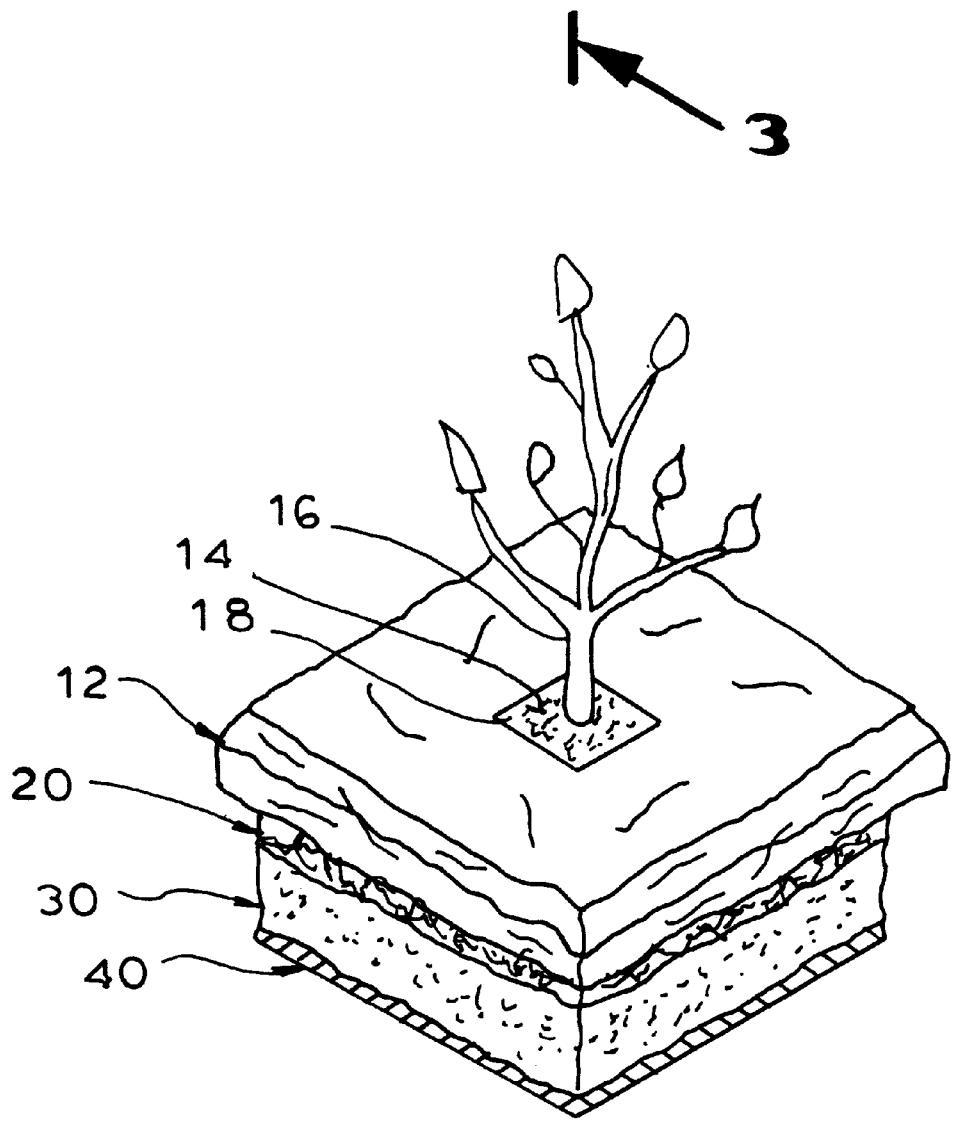
FIG. 2 is an isometric view of the assembled device.
Figure 3:
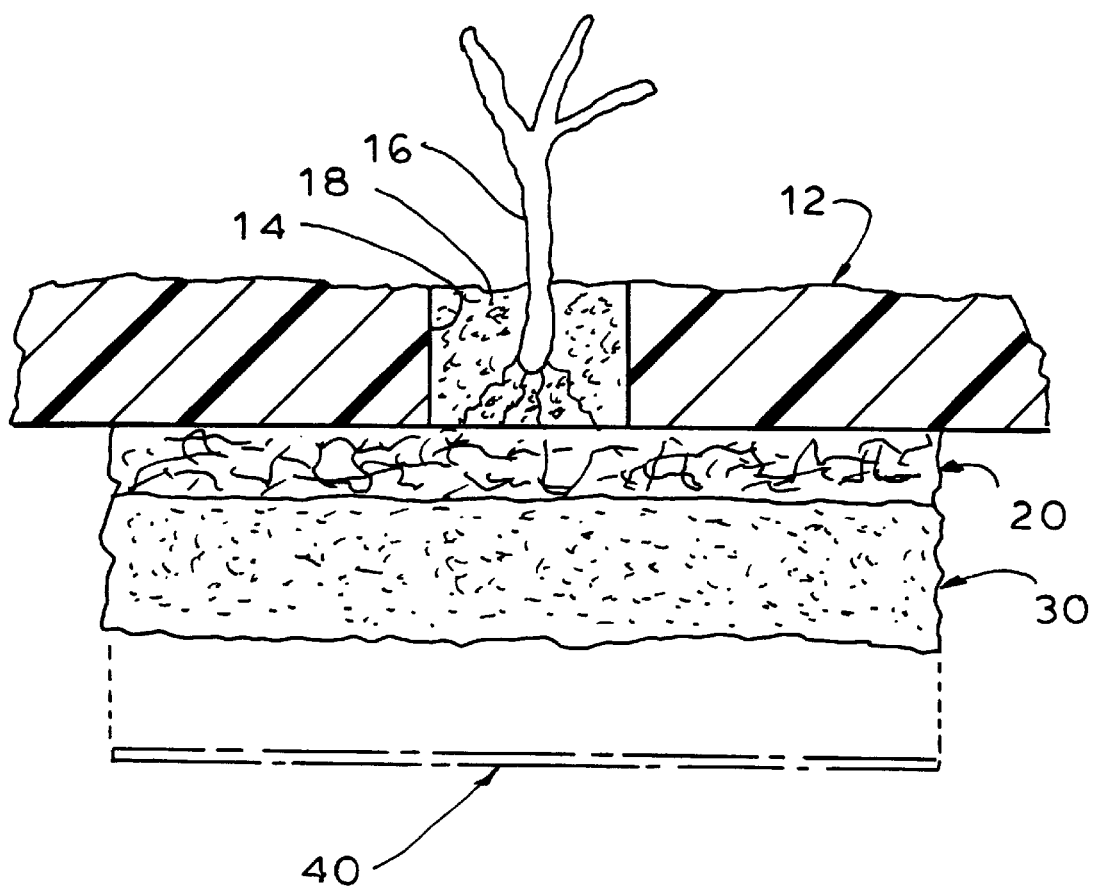
FIG. 3 is a sectional view thereof taken along the line 3—3 of FIG. 2.

Referring now to the drawing, and in particular to FIGS. 1 and 2 thereof, therein illustrated is a floating hydroponic biofiltration device according the present invention, generally designated by the reference numeral 10. The device 10 is intended for use in a body of oxygenated water containing plant-eating fish such as Koi (a large oriental carp). The device combines plant technology and fish technology in a unique and novel manner which eliminates the need for soil or a nutrient solution to be added for plant growth.

The device 10 comprises at least three layers, and preferably four layers, with each layer being glued or otherwise secured to the layer immediately above and/or below the same. In series, from the top of the device to the bottom of the device, the device includes, at the top thereof, a float, generally designated 12, defining at least one aperture 14 therethrough (preferably a centrally disposed aperture). A terrestrial plant 16 is hydroponically mounted in the float aperture 14. While the device allows the growth of terrestrial plants, it will be appreciated that wetland plants and even aquatic plants may be used in place of, or along with, the terrestrial plants. Once the plant 16 has achieved growth, its roots will extend downwardly through the float aperture 14 and the stems and foliage (leaves) will extend above the float top. As noted, the plant 16 will be grown hydroponically so that the float aperture 14 will be essentially devoid of soil or added nutrient solution.

Notwithstanding the above, optionally the plant 16 may be mounted initially in a cube of "starter material" 18 such as the ROCKWOOL or OASIS ROOTCUBES SYSTEM available from Smithers-Oasis of Kent, Ohio to start plants hydroponically.

Next, in the middle of the device is a relatively open mesh, generally designated 20. The mesh 20 extends a substantial distance below the float 12 and is open at the four sides thereof to enable the passage therethrough of oxygenated water from the body of water. Preferably the buoyancy of the device is such that the entire mesh 20 is below the top level of the body of water so that the mesh 20 is constantly bathed in the oxygenated water and available to fish which are beneficial to the plant. The mesh 20 defines vertically extending, optionally tortuous, passageways therethrough for the plant roots while simultaneously serving as a substrate surface for the growth of nitrogen-converting bacteria deposited thereon. Preferably the mesh 20 permits small plant-eating fish (i.e., fish having a length of up to one inch and a thickness of less than 0.50 inch) to pass therethrough. The mesh thus excludes large plant-eating (and omnivorous) fish, such as the adult Koi, from any portion of the plant roots passing therethrough, while permitting relatively smaller plant-eating fish, such as the baby or young Koi, to pass therethrough and deposit both the nitrogen-converting bacteria and their ammonia-containing fish waste thereon. The young small Koi find this mesh 20 to be a safe haven because the adult large Koi are excluded by the mesh 20 and thus cannot reach the young Koi.

Accordingly, the young Koi will tend to congregate in the mesh 20 of the device 10, thereby increasing the concentration of ammonia-containing fish waste and nitrogen-converting bacteria within the device in an area adjacent to the portion of the plant roots passing through the mesh. As the fish pass through the mesh 20, some of the nitrogen-converting bacteria are brushed off the outer surface of the fish by the mesh or excreted by the fish as the fish deposit their ammonia-containing fish waste. While the ammonia-containing fish waste and the nitrogen-converting bacteria (typically the latter being found on the outer surface of the fish) are typically present to some degree throughout the body of water, as a result of the presence of the fish in the mesh 20, optimally an appreciably higher concentration of the bacteria is found within the device of the present invention relative to the body of water generally. Accordingly, the action of the bacteria in the device on the fish waste in the device cleans (or biofilters) the water in the device so that the fish waste level is somewhat lower in the device than in the body of water generally.

It will be appreciated that the mesh 20 may be devoid of nitrogen-converting bacteria until after the device is placed in a body of water. The water and the fish can then introduce the nitrogen-converting bacteria thereto.

Continuing now with the description of the layers of the device 10 in series, adjacent to or as the bottom of the device 10 is a relatively tight matting, generally designated 30. The matting 30 defines tortuous vertically extending passageways therethrough for the roots of plant 16 passing downwardly through the mesh 20. The matting 30 anchors the plant roots and excludes plant-eating fish from the portion of the plant roots passing therethrough.

Optionally, at the bottom, beneath the matting 30, is a relatively strong netting, generally designated 40. The apertures of netting 40 are small enough to exclude plant-eating fish from approaching, from below, the bottom of the matting and destroying it. Exclusion of the large plant-eating fish from the bottom of the matting 30 also protects the portion of the plant roots passing through the matting 30.

While the device 10 may be formed simply of the float layer 12, mesh layer 20 and matting layer 30, use of the netting layer 40 is especially desirable where the plant-eating fish (e.g., Koi) are capable of exerting substantial suction with their mouths in an attempt to reach edible plant roots and can thus destroy the bottom of matting 30. The netting 40 interferes with the vacuuming by the plant-eating fish and so protects the bottom of the matting 30.

It will be appreciated that the plant roots are sufficiently flexible to easily pass through the relatively open mesh 20 and, to some degree, through the tortuous passages of the matting 30 and through the netting 40.

The float 12, mesh 20, matting 30 and, when used, netting 40 are preferably formed of plastics or other materials acceptable in a body of water containing plants and fish while not being particularly edible by the fish (e.g., polyester, polyethylene, polypropylene, etc.)

The float 12 is preferably made of conventional buoyant material for use in water, such as a foamed plastic.

The mesh 20 is preferably made of polyethylene defining passageways therethrough having a maximum cross-sectional dimension of about 0.25–0.60 inch or 6–15 mm. A preferred thickness of the mesh is about 0.75 inch or 19 mm. The mesh 20 is preferably a biofiltration material available under the trade name ENKAMAT or ENKAMAT POLY from Akzo-Noble Geosynthetics of The Netherlands. The material combines, with inedibility, strength and sufficient porosity to allow the ambient water to circulate around the plant roots passing therethrough. A similar material is also available under the trade name ENKAMAT POLY PF 13 (in a thickness of about 0.75 inch or 19 mm) from Aquatic Eco-Systems, Inc.

The matting 30 is preferably a polyester film defining passageways having a maximum cross-sectional dimension of about 0.004 inch or 1 mm, about 5% of the maximum cross-sectional dimension of the mesh passageways. The thickness of the matting is preferably about 1.5 inch or 38 mm, about twice the thickness of the mesh 20.

The netting 40 is preferably made of polypropylene defining passageways having a maximum cross-sectional dimension in each direction of about 0.16 inch or 4.06 mm. The netting is quite thin, about 0.02 inch or 0.5 mm, only about a fourth of the thickness of the mesh 20.

The device 10 is modular in nature. In other words, the same device may contain a number of plants, each in its own float aperture, and various devices may be secured together to form a large device.

To summarize, the present invention provides a floating hydroponic biofiltration device for use in a body of oxygenated body of water containing plant-eating fish such as Koi. The device provides a substrate for the growth of nitrogen-converting bacteria which will convert the ammonia of fish waste to nitrates used by the plants for plant growth. The device further provides a safe haven for small fish. The device is simple and economical to manufacture, use and maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A floating hydroponic biofiltration device for use in a body of oxygenated water containing plant-eating fish, comprising in series:

(A) at the top of the device, a float defining an aperture therethrough and a terrestrial plant hydroponically mounted in said float aperture, said plant having roots extending downwardly through the float bottom and foliage extending above the float top, said float aperture being essentially devoid of soil;

(B) in the middle of the device, a relatively open mesh of substantial depth below said float, said mesh being open at the sides thereof to enable passage of oxygenated water from the body of water therethrough, said mesh defining vertically extending passageways therethrough for said plant roots while also serving as a substrate surface for the growth of nitrogen-converting bacteria deposited thereon, said mesh excluding large plant-eating fish from a portion of said plant roots passing therethrough while permitting relatively smaller plant-eating fish to pass therethrough and deposit nitrogen-converting bacteria and their ammonia-containing fish waste; and (C) adjacent the bottom of the device, a relatively tight matting defining tortuous vertically extending passageways therethrough for said plant roots, said matting anchoring said plant roots and at least partially excluding plant-eating fish from a portion of said plant roots passing therethrough.

2. The device of claim 1 wherein said mesh and matting are formed of plastic.

3. The device of claim 1 additionally including, beneath said matting, a netting to exclude large plant-eating fish from approaching from below the portion of said plant roots passing through said matting.

4. The device of claim 3 wherein said netting is formed of plastic.

5. The device of claim 3 wherein said netting also excludes plant-eating fish from approaching the bottom of said matting.

6. The device of claim 1 wherein said middle of said device is devoid of nitrogen-converting bacteria until said device is placed in a body of water.

7. The device of claim 1 wherein said mesh permits plant-eating fish having a length up to 1 inch and a thickness of less than 0.50 inch to pass therethrough.

8. The device of claim 7 wherein said mesh defines openings of 0.50–0.75 inches in width.

9. A floating hydroponic biofiltration device for use in a body of oxygenated water containing plant-eating fish, comprising in series:

(A) at the top of the device, a float defining an aperture therethrough and a terrestrial plant hydroponically mounted in said float aperture, said plant having roots extending downwardly through the float bottom and foliage extending above the float top, said float aperture being essentially devoid of soil;

(B) in the middle of the device, a relatively open mesh of substantial depth below said float, said mesh being open at the sides thereof to enable passage of oxygenated water from the body of water therethrough, said mesh defining vertically extending passageways therethrough for said plant roots while also serving as a substrate surface for the growth of nitrogen-converting bacteria deposited thereon, said mesh excluding large plant-eating fish from a portion of said plant roots passing therethrough while permitting relatively smaller plant-eating fish to pass therethrough and deposit nitrogen-converting bacteria and their ammonia-containing fish waste;

(C) adjacent the bottom of the device, a relatively tight matting defining tortuous vertically extending passageways therethrough for said plant roots, said matting anchoring said plant roots and at least partially excluding large plant-eating fish from a portion of said plant roots passing therethrough; and (D) at the bottom of the device, a netting to exclude large plant-eating fish from approaching from below the portion of said plant roots passing through said matting.

10. The device in claim 9 wherein said middle of said device is devoid of nitrogen-converting bacteria until said device is placed in a body of water.

11. The device of claim 9 wherein said mesh permits plant-eating fish having a length (thickness) of less than 0.25 inches to pass therethrough and defines openings of 0.50–0.75 inches.

12. The device of claim 9 wherein said mesh is polyethylene, said matting is polyester, and said netting is polypropylene.

13. The device of claim 9 wherein the maximum cross-sectional dimension of the mesh is 0.25–0.60 inch, of the matting is 0.004 inch, and of the netting is about 0.16 inch.

\* \* \* \* \*